UNITED STATES PATENT OFFICE.

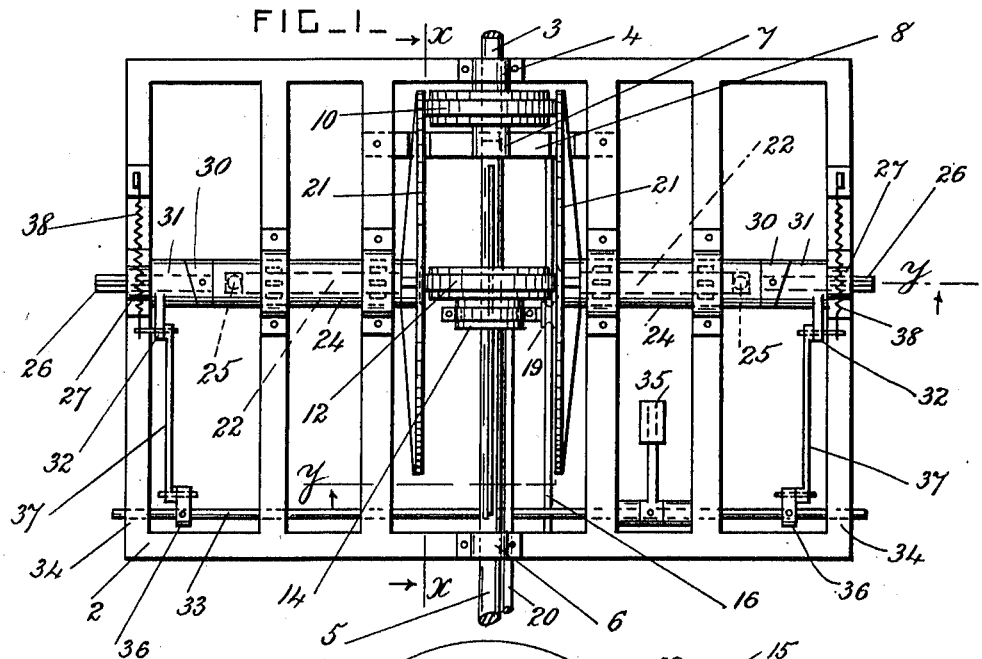

HARRY B. GORRELL, OF CANTON, MISSOURI.

DRIVING MECHANISM.

1,096,783.     Specification of Letters Patent.     Patented May 12, 1914.

Application filed June 11, 1913. Serial No. 772,986.

*To all whom it may concern:*

Be it known that I, HARRY B. GORRELL, a citizen of the United States, residing at Canton, in the county of Lewis and State of Missouri, have invented certain new and useful Improvements in Driving Mechanism; and I do hereby declare the following to be a full, clear, and exact description of the invention, such as will enable others skilled in the art to which it appertains to make and use the same.

This invention relates to frictional driving mechanism or transmission gearing used for driving motor cars and for other purposes; and it consists in the novel construction and combination of the parts hereinafter fully described and claimed.

In the drawings, Figure 1 is a plan view of the driving mechanism. Fig. 2 is a side view taken in section on the line $x$—$x$ in Fig. 1. Fig. 3 is a cross-section taken on the line $y$—$y$ in Fig. 1.

A supporting frame 2 is provided and is of any approved construction. A driving shaft 3 is journaled in a bearing 4 on the frame, and this driving shaft may be the crankshaft of the motor of a motor-car, or it may be driven in any other approved way. The driven shaft or transmission shaft 5 is journaled in a bearing 6 on the frame, and is arranged in line with the shaft 3. A bearing 7 is arranged to support the meeting ends of the two shafts 3 and 5 and is secured to the frame by a bracket 8. A friction driving wheel 10 is rigidly secured on the driving shaft. A friction wheel 12 is splined to the driven shaft 5, or is otherwise connected to it, so that it will revolve with it but may be slid longitudinally of it. The two wheels 10 and 12 are of the same diameter, and the wheel 12 has a hub 14 provided with a circumferential groove 15.

A guide rail or guide rod 16 is secured to the frame, and 17 is a crosshead provided at one end with an eye or strap 18 which engages with the groove 15. A roller 19 is journaled at the other end of the crosshead and runs on the guide rail 16. An operating rod 20 is secured to the crosshead and affords a means for sliding the wheel 12 longitudinally of the shaft 5. The rod 20 is worked by hand or by any approved lever mechanism which is not shown as it is of any approved construction.

Two similar friction disks 21 are provided and are arranged one on each side of the wheels 10 and 12 and in contact with them. Each friction disk has a stem or shaft 22 which is journaled in roller bearings 23 inclosed in a sleeve 24. A ball 25 is arranged at the inner end of the sleeve 24 for the end of the shaft 22 to run against. The sleeve 24 has a shaft 26 which projects from its solid end and is splined in a bearing 27 on the frame. The sleeve 24 itself is mounted in bearings 28 on the frame, and is free to slide therein longitudinally to a limited extent. A face cam 30 is secured to or formed on the shaft 26, and a second face cam 31 is mounted to oscillate on the shaft 26, and is provided with an arm 32.

A rock-shaft 33 is mounted in bearings 34 on the frame and is provided with a treadle 35 or other approved means for operating it. The rock-shaft extends crosswise under the transmission or driven shaft, and has downwardly projecting arms 36 secured on its end portions. Connecting-rods 37 are pivoted to the arms 36 and to the arms 32 which project from the face-cams 31. Springs 38 are provided for operating the arms 32.

When the treadle is raised up the two friction disks are pressed simultaneously against the two friction wheels, so that the driving shaft revolves the driven or transmission shaft. The direction of revolution and the speed of the driven shaft is determined by sliding the friction wheel 12 longitudinally of the driven shaft. When the wheel 12 is arranged on the axis of the friction disks, as shown, it is not revolved, and its direction of revolution is changed by sliding it from one side of the axis to the other. The springs normally press the disks against the friction wheels, and the treadle is depressed in order to slide the slidable friction wheel with greater facility.

What I claim is:

1. In a driving mechanism, the combination, with a driving shaft, a friction driving wheel secured thereon, a driven shaft arranged in line with the driving shaft, and a friction driven wheel secured on the driven shaft; of a stationary support, a sleeve mounted to slide longitudinally in the said support and provided with a shaft at one end, a revoluble friction disk arranged to bear on the said friction wheels and provided with a stem which revolves in the said sleeve, antifriction devices arranged between the said stem and sleeve, a face cam secured on the shaft at one end of the sleeve, and a second face cam mounted to oscillate on the said shaft and provided with an operating device whereby the said disk is moved into and out of engagement with the friction wheels.

2. In a driving mechanism, the combination, with a driving shaft, a friction driving wheel secured thereon, a driven shaft arranged in line with the driving shaft, and a friction driven wheel secured on the driven shaft; of a stationary support, two similar sleeves mounted to slide longitudinally in the said support and provided with shafts at one end, two revoluble friction disks arranged to bear against the said friction wheels on opposite sides thereof and provided with stems which revolve in the said sleeves, antifriction devices arranged between the said stems and sleeves, face cams secured on the shafts at one end of the sleeves, face cams mounted to oscillate on the said shafts and provided with projecting arms, a rock-shaft, and connections between the said rock-shaft and the said arms on the face cams whereby the said face cams are operated simultaneously.

In testimony whereof I have affixed my signature in the presence of two witnesses.

HARRY B. GORRELL.

Witnesses:
  GEO. L. MARTIN,
  CHAS. H. SMITH.

---

Copies of this patent may be obtained for five cents each, by addressing the "Commissioner of Patents, Washington, D. C."